United States Patent [19]
Matsuda et al.
[11] 3,748,399
[45] July 24, 1973

[54] TELEPHONE NON-COIL HYBRID CIRCUITS UTILIZING ACTIVE ELEMENTS

[75] Inventors: Ryoichi Matsuda, Musashino City; Masaaki Terai, Hoya City; Yasuo Hojyo, Irumagawa, Sayama, all of Japan

[73] Assignee: Nippon Telegraph and Telephone Public Corporation, Tokyo, Japan

[22] Filed: June 16, 1971

[21] Appl. No.: 153,516

[30] Foreign Application Priority Data

July 23, 1970 Japan ............ 45/63934

[52] U.S. Cl. ............ 179/81 A, 179/170 NC
[51] Int. Cl. ............ H04m 1/58
[58] Field of Search ............ 179/81 A, 170 NC

[56] References Cited

UNITED STATES PATENTS 2,645,681 7/1953 Green ............ 179/81 A
3,546,395 12/1970 Schuh ............ 179/81 A
3,597,550 8/1971 Sternbeck ............ 179/81 A

*Primary Examiner*—Thomas W. Brown
*Attorney*—Chittick, Pfund, Birch, Samuels & Gauthier

[57] ABSTRACT

In a telephone circuit of the class comprising a transmitter and a receiver connected to a subscriber's line, there are provided a voltage divider connected to the transmitter for dividing the voltage of the signal transmitted by the transmitter, an amplifier connected between the voltage divider and the subscriber's line for supplying thereto an AC current propotional to the voltage divided by the voltage divider, the receiver being connected across the juncture between the transmitter and the voltage divider and the juncture between the amplifier and the subscriber's line, a first variable impedance element connected across the transmitter, and a second variable impedance element connected across the receiver, the first and second variable impedance elements varying their impedances in accordance with the DC voltage across the subscriber's line.

11 Claims, 5 Drawing Figures

INVENTORS
RYOICHI MATSUDA
MASAAKI TERAI
YASUO HOJYO

BY Chittick, Pfund, Birch, Samuels and Gauthier
ATTORNEYS

INVENTORS

RYOICHI MATSUDA
MASAAKI TERAI
YASUO HOJYO

BY Chittick, Pfund, Birch, Samuels & Gauthier
ATTORNEYS

INVENTORS
RYOICHI MATSUDA
MASAAKI TERAI
YASUO HOJYO
BY Chittick, Pfund, Birch, Samuels & Gauthier
ATTORNEYS

TELEPHONE NON-COIL HYBRID CIRCUITS UTILIZING ACTIVE ELEMENTS

BACKGROUND OF THE INVENTION

This invention relates to a telephone circuit, and more particularly to an antisidetone telephone circuit not utilizing a hybrid transformer and which can be fabricated as an integrated circuit. The novel telephone circuit utilizing an active element can automatically and satisfactorily suppress the sidetone and can provide an adequate level of speech in accordance with the length of the telephone line to which the telephone set is connected.

The antisidetone circuit now being widely used in conventional telephone sets comprises a hybrid transformer connected and arranged so as to prevent two sets of terminal pairs from being mutually coupled electrically. With such an antisidetone circuit even when the hybrid transformer is ideally constructed, attenuations of 3dB are unavoidable for both transmission and reception of the speech. Moreover, from the standpoint of economy, since the hybrid transformers actually used in commerical telephone sets are rather simple, the attenuation of the transmitted and received speeches is generally larger than 3dB.

Although the hybrid transformer is advantageous from the standpoint of durability and simplicity because it is comprised by a magnetic core and coils it increases the physical dimension and weight of the telephone set, particularly in the case of telephone sets of the dial-in handset type.

Furthermore, in the conventional telephone circuit, in order to prevent excesively large sending and receiving levels caused by a short subscriber's line, the extent of attenuation is manually adjusted. Such a manual adjustment, however is troublesome so that it is highly desirable to provide means capable of automatically adjusting the sending and receiving levels in accordance with the line loss.

To eliminate the above described defects of the hybrid transformer, a new type of an antisidetone circuit not utilizing the hybrid transformer has recently been proposed. Thus, for example, U.S. Pat. No.3,440,367 discloses a combination of a resistance Wheatstone bridge and an amplifier, U.S. Pat. No.3,227,812 discloses an arrangement wherein a portion of the transmission output appearing across the transmission terminal is applied through an amplifier to the receiving side with opposite phase for preventing the sidetone, and U.S. Pat. No.3,180,047 discloses an arrangement wherein the transmission output is applied to a pair of amplifiers of the opposite phases and the outputs from the amplifiers are combined in the receiver for suppressing the sidetone. Another approach involves an arrangement by which a transistor is included in an antisidetone circuit and the receiver is connected across two points between which the receiver outputs appear at the same phase.

However, these arrangements are not advantageous on the following grounds. More particularly, with a simple circuit arrangement, the attenuation of the transmitted and received speeches is increased but the decrease in the attenuation can be attained only with a complicated circuit construction. Where the transmitter is energized from a central office battery the operating points of the active element vary greatly for different length of the line thus resulting in the distortion as well the variation of the gain. On the other hand, if the circuit is constructed to have a constant D.C. operating point, the non-liner elements included in the circuit become difficult to operate, thus affecting the operation of the automatic level control. Moreover, as the operation of the circuit is largely influenced by the difference in the operating characteristics of the elements it becomes difficult to fabricate the circuit with integrated semiconductor circuit elements. For this reason, such a design is not applicable to telephone circuits.

SUMMARY OF THE INVENTION

It is therefore an object of this invention to provide a novel telephone circuit utilizing active elements which is simple in circuit construction and can greatly decrease the attenuation of the sending and receiving levels.

Another object of this invention is to provide an improved telephone circuit provided with a power supply circuit which can always maintain a constant D.C. condition in the telephone circuit and can effectively prevent distortion of the sending and receiving levels as well as the variation in the gain caused by the difference in the length of the subscriber's line.

Still another objects of this invention is to provide a novel telephone circuit wherein active elements which vary their impedances according to the D.C. voltage appearing across input terminals of a telephone set are associated with both transmitter and receiver, thereby automatically maintaining the sending and receiving levels at a proper value at any time. A further object of this invention is to provide an improved telephone circuit of small size and light weight by fabricating the circuit with component elements that can be fabricated into an integrated circuit, excepting the transmitter, receiver and capasitors.

According to this invention there is provided transmitting means, voltage dividing means connected to the transmitting means for dividing the voltage of the signal sent from the transmitting means, an amplifier for producing an AC current proportional to the voltage divided by the voltage dividing means, a subscriber's line connected to the output of the amplifier, receiving means connected across the juncture between the transmitter means and the voltage dividing means and the juncture between the amplifier and the subscriber's line, a first variable impedance element connected across the transmitting means and a second variable impedance element connected across the receiving means, said first and second variable impedance elements varying their impedances in accordance with the DC voltage across the subscriber's line.

BRIEF DESCRIPTION OF THE DRAWINGS

Further objects and advantages can be more fully understood from the following detailed description take in conjunction with the accompanying drawings, in which.

DESCRIPTION OF THE PREFERRED EMBODIMENTS

Figure 1:
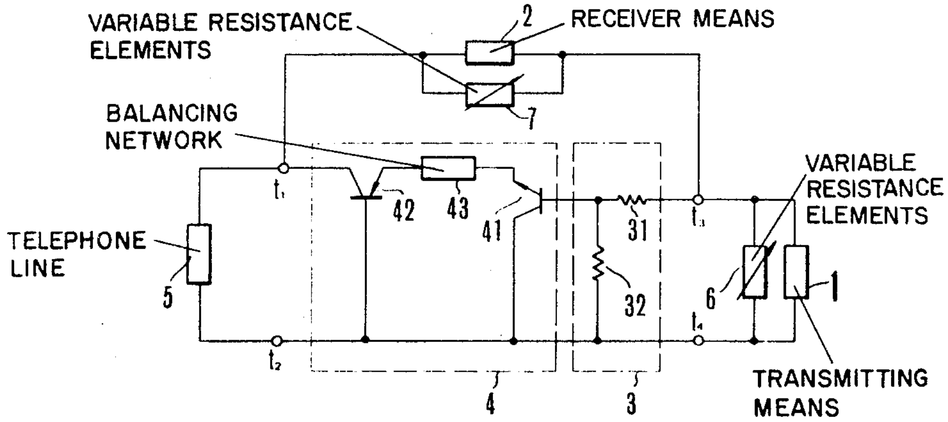
FIG. 1 is a circuit diagram to explain the principle of the novel telephone circuit.

With reference first to FIG. 1 of the accompanying drawing, the novel telephone circuit shown therein comprises transmitting means 1 utilizing a carbon transmitter, a receiver means 2 utilizing the electromagnetic receiver, a voltage dividing circuit 3, an amplifier 4 and variable resistance elements 6 and 7 which are connected on the opposite ends of a telephone line 5. The amplifier 4 comprises a four terminal network including two transistors 41 and 42 and a balancing network 43 whereas the voltage dividing circuit 3 comprises a four terminal network including two resistors 31 and 32 connecting in the form of a letter L. One side of amplifier 4 is connected to terminals $t_1$ and $t_2$ of the subscriber's line whereas, the opposite is connected to terminals $t_3$ and $t_4$ of transmitter 1 through the voltage dividing circuit 3. Variable resistance element 6 is connected in parallel with transmitter 1. Receiver 2 is connected acrõss terminals $t_1$ and $t_3$ together with variable resistance element 7.

In the telephone circuit described above, the transmission signal voltage $V_T$ generated by transmitter 1 is applied to amplifier 4 with a value V*i* expressed by $$Vi = (R_2/R_1 + R_2) \cdot V_T \tag{1}$$

where $R_1$ and $R_2$ represent resistance values of resistors $R_1$ and $R_2$ of the voltage dividing circuit 3. Consequently, the voltage V*i* is impressed across the base and collector electrodes of a collector grounded transistor 41 acting as the input stage of amplifier 4. Input voltage V*i* to amplifier 4 appears at the same phase on the emitter electrode of transistor 41 and connected into a current $i_L$ expressed by the following equation 2 by the action of a base grounded transistor 42 acting as the output stage of amplifier 4, and balancing network 43 connected to the emitter electrode of transistor 42, and current $i_L$ is applied to subscriber's line 5 through its terminal $t_1$ and $t_2$.

$$i_L = 1/N\ Vi = 1/N\ (R_1/R_1 + R_2)\ V_T \tag{2}$$

where N represents the impedance of the balancing network 43.

Denoting the impedance of the subscriber's line 5 by L the voltage $V_L$ impressed across terminals $t_1$ and $t_2$ thereof can be expressed as follows:

$$V_L = L\ i_L = L/N\ (R_2/R_1 + R_3)\ V_T \tag{3}$$

Denoting the impedance N of balancing network 43 by an equation.

$$N = L\ (R_2/R_1 + R_2) \tag{4}$$

the input terminal $t_3$ of receiver 2 and input terminal $t_1$ of the subscriber's line will assume the same phase and the same potential with the result that the sidetone can be suppressed.

Assuming that the variable resistance elements are not connected in the telephone circuit, the relationship between power atternuation $b_T$ from transmitter 1 to subscriber's line 5 and power attenuation $b_R$ from subscriber's line 5 to receiver 2 is expressed by $$b_T = 20 \log \mid (T + L)/(2\ \sqrt{TL}) \mid \text{(dB)} \tag{5}$$

$$b_R = 20 \log \mid (R + L)/(2\ \sqrt{RL}) \mid \text{(dB)} \tag{6}$$

where T and R represent impedances of transmitter 1 and receiver 2, respectively.

This means that by suitably selecting the values of impedances T and R according to equations 5 and 6 it is possible to make sufficiently small the values of $b_T$ and $b_R$. For example, let T = R = 300 ohms, L = 600 ohms, then we have $b_T = b_R = 0$dB which is sufficiently small when compared with a conventional telephone circuit using a hybrid transformer.

Further, in input impedance $Z_{IN}$ of the telephone circuit shown in FIG. 1 becomes equal to an impedance including a parallel combination of receiver 2 and variable impedance element 7 (having an impedance of M).

$$Z_{IN} = RM/R + M$$

Figure 2:
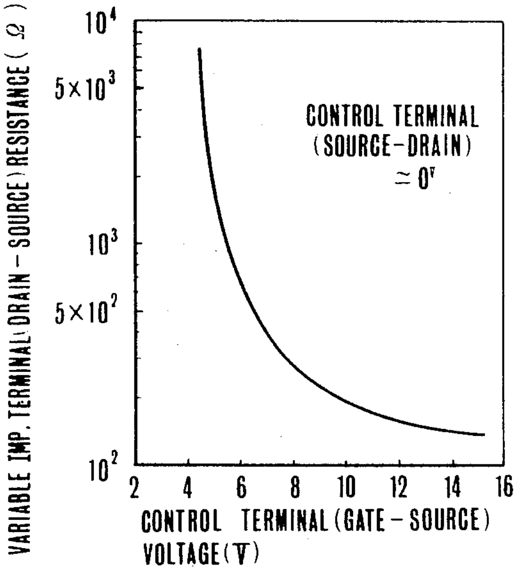
FIG. 2 is a plot of a characteristic curve of a variable impedance element employed in this invention.

Variable resistance elements 6 and 7 are of the type that decrease their resistance values with the increase in the DC voltage impressed across terminals $t_1$ and $t_2$ of the subscriber's line. As a consequence when the subscriber's line is short, transmitter 1 and receiver 2 are shunted by low resistances so as to automatically adjust sending and receiving levels to proper values. Such variable resistance elements may comprise FET type transistors with their source and drain electrodes connected across the output terminals of the transmitter and across the input terminals of the reciever, respectively, and their gate electrodes to terminal $t_1$ of the subscriber's line. In this case, it is not necessary to apply DC voltage across the drain and source electrodes. FIG. 2 shows the variable resistance characteristic of a FET type transistor. In this manner when FET type transistors are used as the variable resistance elements is possible to fabricate them in an integrated circuit together with other circuit elements.

Figure 3:
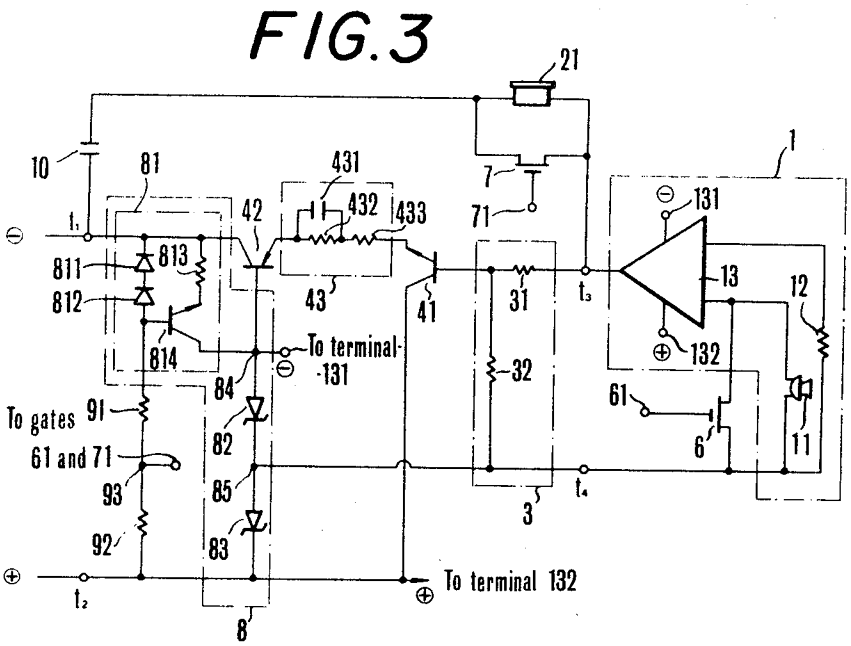
FIG. 3 is a connection diagram of one example of the telephone circuit embodying the invention.

FIG. 3 shows a detail of the connection of one embodiment of the novel telephone circuit. As shown, the transmitting means 1 comprises an electromagnetic transmitter 11, a resistor 12 and a sending amplifier 13 with terminals 131 and 132 connected to a source of supply. Variable resistance elements 6 and 7 are shown as FET type transistors. In this example, an electromagnetic receiver 21 is used as the receiving means. A balancing network 43 acting as an impedance device comprises a parallel combination of a resistor 432 and a capacitor 431 and a resistor 433 connected in series with the parallel combination. In this embodiment, a circuit network 8 is used as means for supplying DC for sending amplifier 13. The DC supply means is connected to terminals $t_1$ and $t_2$ of the subscriber's line and comprises a constant current circuit 81 including a pair of serially connected diodes 811 and 812, a resistor 813 and transistor 814, and a pair of Zener diodes 82 and 83 connected in series across the collector electrode of transistor 814 and terminal $t_2$. Serially connected diodes 811 and 812 are connected between terminal $t_1$ and the base electrode of transistor 814. The cathode electrode of diode 811 is connected to terminal $t_1$ while the anode electrode of diode 812 is connected to the base electrode of transistor 814. Resistor 813 is connected between terminal $t_1$ and the emitter electrode of transistor 814. The polarity of the serially connected Zener diodes is to pass current from the collector electrode of transistor 814 to terminal $t_2$. The juncture 84 between collector electrode of transistor 814 and the cathode electrode of Zener diode 82 is connected to the base electrode of the transistor 42 and to the negative terminal 131 of sending amplifier 13. The juncture 85 between two Zener diodes 82 and 83 is connected to the terminal $t_4$ of transmitter 11 via potentiometer circuit 3. The anode electrode of Zener diode 83, or terminal $t_2$ is connected to the positive terminal of sending amplifier 13.

With this circuit construction, the output from the constant current circuit 81 reversely biases Zener diodes 82 and 83 and the positive and negative constant voltages across Zener diodes 82 and 83 are supplied to the sending amplifier 13, the potential at the common juncture between the Zener diodes being taken as a reference potential. For this reason, variation in the DC voltage (line voltage) across terminals $t_1$ and $t_2$ of the telephone circuit does not vary the gain of the sending amplifier 13. The base electrode of transistor 41 of amplifier 4 is biased by the DC voltage at the output terminal of the sending amplifier 13, whereas the base electrode of transistor 42 is biased by the voltage across Zener diodes 82 and 83.

In the embodiment shown in FIG. 3 two resistors 91 and 92 are connected in series with serially connected diodes 811 and 812 for deriving out a voltage corresponding to the DC voltage across the terminals of the subscriber's line and is used to control the FET type transistors comprising the variable resistance elements. More particularly, the voltage at the juncture 93 between resistors 91 and 92 is supplied to the gate electrodes 61 and 71 of the FET type transistors 6 and 7 thereby to automatically regulate the sending and receiving levels. To block the DC current, a blocking capacitor 10 is connected between terminal $t_1$ and the receiver 2.

Since the embodiment shown in FIG. 3 operates in the same manner as the basic construction shown in FIG. 1, it is believed unnecessary to described it again.

Thus, it will be clear that according to the invention the degree of attenuation of the sending and receiving levels is greatly decreased by the use of the active elements whereby it is possible to automatically regulate the sending and receiving levels to an appropriate level in according with the length of the subscriber's line. Moreover, as the conventional hybrid transformer has been eliminated it is possible to assemble all elements as an integrated circuit on the same substrate excepting the transmitter, receiver and capacitors, thus greatly decreasing the size and weight of the telephone set.

In the embodiment shown in FIG. 3, since the input impedance of the telephone circuit comprises the impedance of the parallel combination of the electromagnetic receiver 2 and the variable resistance element 7 it is difficult to match the latter impedance with the line impedance.

Figure 4:
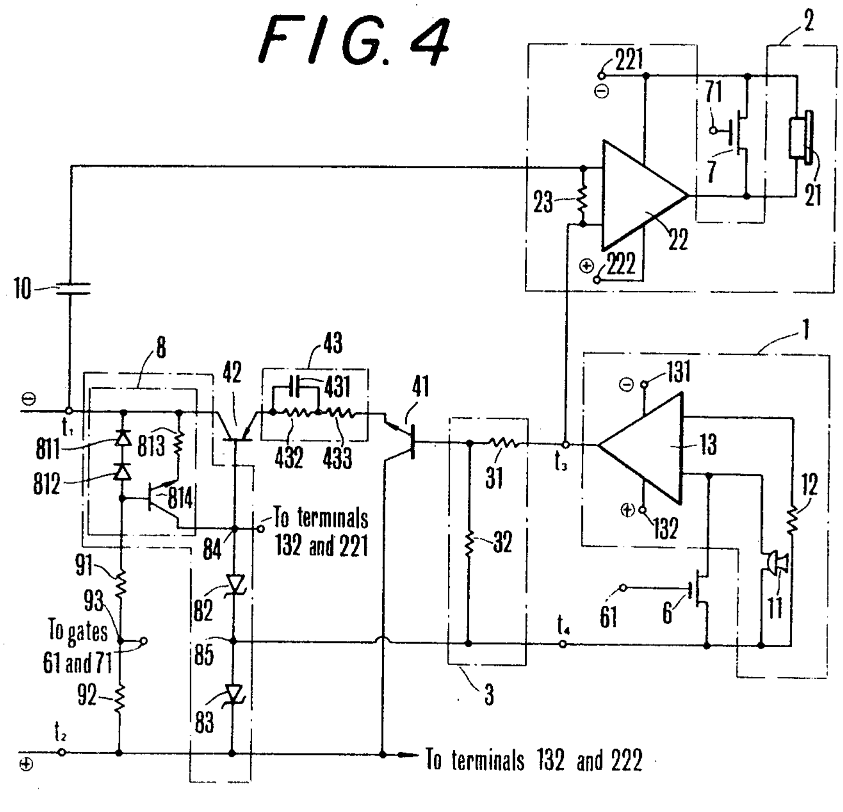

A modification shown in FIG. 4 can obviate this problem, in which the receiving means 2 is comprised by an electromagnetic receiver 21, a receiving amplifier 22 and an resistor 23 determining the input impedance of the amplifier. The amplifier is provided with source terminals 221 and 222. With this construction as the FET type transistor 7 acting as the variable resistance element is connected between receiving amplifier 22 and receiver 21, the input impedance of the receiving means is determined by the value of resistor 23 independently of the resistances of the FET type transistor 7 and the electromagnetic receiver 21. Consequently, proper selection of the value of resistor 23 enables easy matching of the input impedance of the receiving means 2 and the impedance of the subscriber's line. It is to be understood that terminals 221 and 222 are connected to junctures 84 and $t_2$, respectively. The embodiment shown in FIG. 4 operates in the same manner as that of the basic circuit shown in FIG. 1. In addition to the advantages already described in connection with FIG. 3 the matching between the line impedance and the receiver impedance is easy. Moreover, since use is made of a receiving amplifier it is possible not only to miniaturize the receiver but also to use a receiver of relatively low sensitivity.

Figure 5:
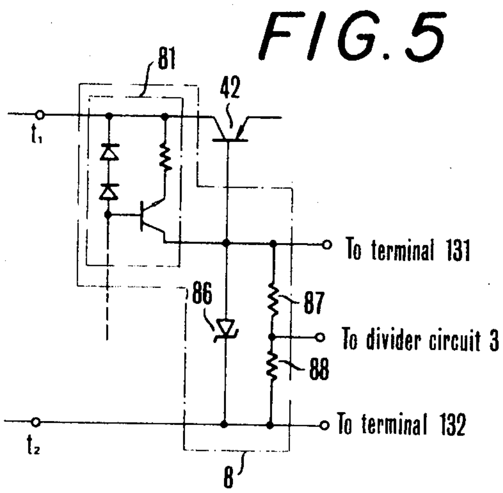
FIG. 4 shows a connection diagram of a modified embodiment of this invention and a modified power supply circuit employed in this invention and FIG. 5 shows a connection diagram of a modified power supply circuit employed in this invention.

FIG. 5 shows a modification of the DC supply circuit 8. At present, since it is difficult to obtain low voltage Zener diodes which can be fabricated as an integrated circuit, in the circuit shown in FIG. 5, only one Zener diode 86 is used in the constant current circuit and a voltage dividing circuit comprising serially connected resistors 87 and 88 is connected in parallel with the Zener diode 86. Opposite terminals and the midpoint of the voltage dividing circuit are connected to terminals 131, 132, and the voltage dividing circuit 3, respectively.

It should be understood that many changes and modifications will occur to one skilled in the art within the scope of the invention as defined in the appended claims.

What is claimed is:

1. A telephone circuit comprising transmitting means, voltage dividing means connected to said transmitting means for dividing the voltage of the signal sent from said transmitting means, an amplifier for producing an AC current irrespective of a load connected thereto and proportional to the voltage divided by said voltage dividing means, a subscriber's line connected to the output of said amplifier, receiving means connected across the juncture between said transmitting means and said voltage dividing means and the juncture between said amplifier and said subscriber's line, a first variable impedance element connected across said transmitting means, said first variable impedance element varying its impedance in accordance with the DC voltage across said subscriber's line, and a second variable impedance element connected across said receiving means, said second variable impedance element varying its impedance in accordance with the DC voltage across said subscriber's line.

2. The telephone circuit according to claim 1 wherein said amplifier comprises a first transistor with its base and collector electrodes connected across the output terminals of said voltage dividing means, a second transistor with its base and collector electrodes connected across the terminals of said subscriber's line, and a balancing circuit network connected between the emitter electrode of said first transistor and the emitter electrode of said second transistor, the collector electrode of said first transistor and the base electrode of said second transistor being connected together.

3. The telephone circuit according to claim 1 wherein said transmitter means comprises an electromagnetic transmitter, and a sending amplifier connected to the output terminals of said electromagnetic transmitter, said amplifier being also connected to a DC source for supplying a constant voltage for transmission.

4. The telephone circuit according to claim 2 wherein said receiving means comprises a receiving amplifier with its input terminals connected to said subscriber's line, an input resistor connected across the input terminal of said receiving amplifier, and an electromagnetic receiver, one terminal of said receiver being connected to the output terminal of said receiving amplifier while the other terminal to the source of said receiving amplifier.

5. The telephone circuit according to claim 1 wherein said first variable impedance comprises a FET type transistor having a drain terminal and a source terminal which are connected across the electromagnetic transmitter of said transmitting means and a gate terminal connected to means sensing the DC voltage across said subscriber's line.

6. The telephone circuit according to claim 1 wherein said second variable impedance element comprises a FET type transistor having a drain terminal and a source terminal which are connected across the electromagnetic receiver of said receiving means and a gate terminal connected to means sensing the DC voltage across said subscriber's line.

7. The telephone circuit according to claim 3 wherein said DC supply circuit comprises a constant current circuit connected to said subscriber's line, and biasing means for biasing said constant current circuit so as to cause it to supply a constant voltage.

8. The telephone circuit according to claim 5 wherein said means for sensing said DC voltage across said subscriber's line comprises a resistance potentiometer connected across said subscriber's line.

9. The telephone circuit according to calim 7 wherein said biasing means comprises at least one Zener diode connected to said constant current circuit.

10. A telephone circuit comprising a DC supply circuit including a constant current circuit and two Zener diodes; said constant current circuit and said Zener diodes being serially connected across a subscriber's line; said constant current circuit including a diode circuit with its negative pole connected to the first terminal of said subscriber's line and a first transistor having a base electrode connected to the positive pole of said diode circuit, an emitter electrode connected to the negative pole of said diode circuit, and a collector electrode connected to the negative pole of the Zener diode circuit; a potentiometer with one end connected to the positive pole of said diode circuit and the other end connected to the second terminal of said subscriber's line; an amplifier including a second transistor having a collector electrode connected to the first terminal of said subscriber's line, and a base electrode connected to the negative pole of said Zener diode circuit, a balancing circuit network with one terminal connected to the emitter electrode of said second transistor, and a third transistor having an emitter electrode connected to the other terminal of said balancing circuit network and a collector electrode connected to the second terminal of said subscriber's line; voltage dividing means including a first resistor with one end connected to the base electrode of said third transistor, and a second resistor with one end connected to the base electrode of said third transistor, and the other end connected to the common juncture between said Zener diodes; transmitting means including an electromagnetic transmitter with one terminal connected to the other end of said second resistor of said voltage dividing means, and a sending amplifier with its input terminals connected across said electromagnetic transmitter and its output terminal connected to the other end of said first resistor of said voltage dividing means; said sending amplifier having driving terminals connected across said Zener diode circuit; an electromagnetic receiver connected between the first terminal of said subscriber's line and the output terminal of said sending amplifier; a first FET type transistor including a drain terminal and a source terminal which are connected across said electromagnetic transmitter; and a second FET type transistor including a drain terminal and a source terminal which are connected across said electromagnetic receiver, the gate terminals of said first and second FET type transistors being connected to an intermediate terminal of said potentiometer.

11. A telephone circuit comprising a DC supply circuit including a constant current circuit and a pair of Zener diodes, said constant current circuit and said Zener diodes being connected in series across the terminals of a subscriber's line; said constant current circuit including a diode circuit with its negative pole connected to the first terminal of said subscriber's line; a first transistor having a base electrode connected to the positive pole of said diode circuit, an emitter electrode connected to the negative pole of said diode circuit and a collector electrode connected to the negative pole of said Zener diode circuit; a potentiometer with one terminal connected to the positive pole of said diode circuit and the other terminal connected to the second terminal of said subscriber's line; an amplifier including a second transistor having a collector electrode connected to the first terminal of said subscriber's line and a base electrode connected to the negative pole of said Zener diode circuit, a balancing circuit network with one terminal connected to the emitter electrode of said second transistor, and a third transistor having an emitter electrode connected to the other terminal of said balancing circuit network and a collector electrode connected to the second terminal of said subscriber's line; voltage dividing means including a first resistor with one terminal connected to the base electrode of said third transistor, and a second resistor with one terminal connected to the base electrode of said third transistor and the other terminal connected to the common juncture between said Zener diodes; transmitter means including an electromagnetic transmitter with one terminal connected to the other terminal of said second resistor, and an sending amplifier including input terminals connected across said electromagnetic transmitter, an output terminal connected to the other terminal of said first resistor of said voltage dividing means and driving terminals connected across said Zener diode circuit; receiving means including a receiving amplifier with its input terminals connected to said first terminal of said subscriber's line and to the output terminal of said sending amplifier, an impedance matching resistor connected across the input terminals of said receiving amplifier, and an electromagnetic receiver connected between the output terminal of said receiving amplifier and the negative pole of said Zener diode circuit; the driving terminals of said receiving amplifier being connected across said Zener diode circuit; a first FET type transistor having a drain terminal and a source terminal which are connected across said electromagnetic transmitter; and a second FET type transistor having a drain terminal and a source terminal which are connected across said electromagnetic receiver; the gate terminals of said first and second FET type transistors being connected to an intermediate terminal of said potentiometer.

* * * * *